(12) United States Patent
Decker et al.

(10) Patent No.: US 10,875,806 B2
(45) Date of Patent: Dec. 29, 2020

(54) ORGANIC-INORGANIC COMPOSITE FIBERS AND METHODS THEREOF

(71) Applicant: Corning Incorporated, Corning, NY (US)

(72) Inventors: Heather Bossard Decker, Arkport, NY (US); Shandon Dee Hart, Corning, NY (US); Jenny Kim, Horseheads, NY (US); Yanfei Li, Corning, NY (US); Joseph Edward McCarthy, Hornell, NY (US); Nicholas James Smith, Port Matilda, PA (US); James William Zimmermann, Corning, NY (US)

(73) Assignee: Corning Incorporated, Corning, NY (US)

( * ) Notice: Subject to any disclaimer, the term of this patent is extended or adjusted under 35 U.S.C. 154(b) by 93 days.

(21) Appl. No.: 16/013,006

(22) Filed: Jun. 20, 2018

(65) Prior Publication Data

US 2019/0023603 A1   Jan. 24, 2019

Related U.S. Application Data

(60) Provisional application No. 62/534,340, filed on Jul. 19, 2017.

(51) Int. Cl.
*C03B 37/028* (2006.01)
*C09D 179/08* (2006.01)
(Continued)

(52) U.S. Cl.
CPC ............ *C03B 37/028* (2013.01); *C03B 19/02* (2013.01); *C03B 19/025* (2013.01); *C03C 3/17* (2013.01);
(Continued)

(58) Field of Classification Search
CPC ... C03B 2203/40; C03B 19/02; C03C 13/048; C03C 2313/00; C03C 2214/12;
(Continued)

(56) References Cited

U.S. PATENT DOCUMENTS 3,732,181 A * 5/1973 Ray et al. ............... B32B 27/00
523/207
5,043,369 A 8/1991 Bahn et al.
(Continued)

FOREIGN PATENT DOCUMENTS

KR       1285306 B1    7/2013

OTHER PUBLICATIONS

Barber et al; "Extreme Strength Observed in Limpet Teeth"; J.R. Soc. Interface; 12; (2015); 6 Pages.
(Continued)

*Primary Examiner* — Camie S Thompson

(57) ABSTRACT

An organic-inorganic composite, including: a discontinuous phase having a plurality of adjacent and similarly oriented fibers of an inorganic material; and a continuous organic phase having a thermoplastic polymer, such that the continuous organic phase surrounds the plurality of adjacent and similarly oriented fibers of the inorganic material, and the organic-inorganic composite is a plurality of adjacent and similarly oriented fibers of inorganic material contained within a similarly oriented host fiber of the thermoplastic polymer. Also disclosed are methods of making and using the composite.

9 Claims, 4 Drawing Sheets

(51) Int. Cl.

| | | |
|---|---|---|
| *C03B 19/02* | (2006.01) | |
| *C03C 13/04* | (2006.01) | |
| *C03C 25/32* | (2018.01) | |
| *C03C 3/17* | (2006.01) | |
| *G02B 6/02* | (2006.01) | |
| *G02B 6/04* | (2006.01) | |

(52) U.S. Cl.
CPC ............ *C03C 13/048* (2013.01); *C03C 25/32* (2013.01); *C09D 179/08* (2013.01); *C03B 2203/40* (2013.01); *C03B 2205/56* (2013.01); *C03C 2213/00* (2013.01); *G02B 6/02395* (2013.01); *G02B 6/04* (2013.01)

(58) Field of Classification Search
CPC ........... C03C 14/00; C03C 3/16; C03C 3/247; C03C 13/00; C03C 13/48; C03C 2213/00; C09D 179/08; G02B 6/0295; G02B 6/04; B32B 2262/101; B32B 2307/54; B32B 2307/546; B32B 5/28; B32B 27/00; Y10T 428/2938; Y10T 442/685; Y10T 442/608; Y10T 442/604; D04H 3/004; D04H 1/4218; D01F 1/10; C08K 3/40
USPC ...... 501/11, 32, 44; 523/466, 207, 209, 223, 523/307; 442/331, 334; 428/378, 426; 65/137, 66; 524/492, 494, 414
See application file for complete search history.

(56) References Cited

U.S. PATENT DOCUMENTS

| | | |
|---|---|---|
| 5,328,874 A | 7/1994 | Beall et al. |
| 5,872,067 A | 2/1999 | Meng et al. |
| 6,268,425 B1 | 7/2001 | Frayer et al. |
| 7,166,661 B2 | 1/2007 | Kuramoto et al. |
| 2011/0043719 A1 | 2/2011 | Thunhorst et al. |
| 2012/0040002 A1* | 2/2012 | Lehtonen ................ A61L 27/10 424/487 |
| 2015/0133934 A1* | 5/2015 | Felfel .................... A61B 17/80 606/60 |

OTHER PUBLICATIONS

Cordero et al; "Channel Cracks in a Hermetic Coating Consisting of Organic and Inorganic Layers"; Applied Physics Letters, 90, (2007); 111910-1-111910-3.
Hart et al; "External Reflection From Omnidirectional Dielectric Mirror Fibers"; Science, vol. 296, (2002); pp. 510-513.
Jackson et al; "The Mechanical Design of Nacre"; Proc. R. Soc. Lond. B.; 234; (1988); 29 Pages.
Kaufman et al; "Thermal Drawing of High-Density Macroscopic Arrays of Well-Ordered Sub-5-NM-Diameter Nanowires"; Nano Lett. 11, (2011) pp. 4768-4773.
Li et al; "Pervasive Nanoscale Deformation Twinning As a Catalyst for Efficient Energy Dissipation in a Bioceramic Armour"; Nature Materials, vol. 13; (2014); pp. 501-507.
Park et al; "Thin Film Encapsulation for Flexible AM-OLED: A Review"; Semicond. Sci. Technol.; 26; (2011) 8 Pages.
Podsiadlo et al; "Ultrastong and Stiff Layered Polymer Nanocomposites"; Science; vol. 318; (2007); pp. 80-83.
Tang et al; "Nanostructured Artifical Nacre"; Nature Materials; vol. 2; (2003); 7 Pages.
Weber et al; "Giant Birefringent Optics in Multilayer Polymer Mirrors"; Science; vol. 287; (2000) pp. 2451-2456.
Yaman et al; "Arrays of Indefinitely Long Uniform Nanowires and Nanotubes"; Nature Materials; vol. 10, Jul. 2011; pp. 494-501.
International Search Report and Written Opinion PCT/US2018/042810 dated Oct. 2, 2018.

\* cited by examiner

US 10,875,806 B2

ORGANIC-INORGANIC COMPOSITE FIBERS AND METHODS THEREOF

The present application claims the benefit of priority under 35 U.S.C. § 119 to U.S. Provisional Patent Application No. 62/534,340, filed on Jul. 19, 2017, the contents of which are relied upon and incorporated herein by reference in its entirety.

The entire disclosure of each publication or patent document mentioned herein is incorporated by reference.

BACKGROUND

The disclosure relates to organic-inorganic composites, composite fibers, and to methods thereof.

SUMMARY

In embodiments, the disclosure provides organic-inorganic composites, composite fibers having micro- and nano-scale diameters, articles including the composite fibers, and to methods of making and using the composites and composite fibers.

In embodiments, the disclosure provides an organic-inorganic composite having high optical transparency and comprising fibers or filaments of an inorganic material in an organic matrix such as in the form of a fiber, which organic matrix encapsulates the inorganic fibers or filaments.

In embodiments, the disclosure provides an organic-inorganic composite having discontinuous inorganic domains substantially along two dimensions or two axes, for example, a fiber bundle, a honeycomb structure, a fiber, and like structures.

In embodiments, the disclosed organic-inorganic composite has fibers or filaments of inorganic material that are elongated and have cross-sectional diameters, for example, less than about 10 microns, and an aspect ratio (i.e., length/diameter), for example, of from about 100:1, of from about 1000:1, or of from about 10,000:1, including intermediate values and ranges.

In embodiments, the disclosed organic-inorganic composite has a high optical transparency characterized by a total optical transmission (e.g., specular and diffuse) greater than about 20% when measured in the axial direction through a 1 mm cross-section of the fiber, or when measured in the axial or transverse direction through a cross-section of the fiber (or a bonded bundle of fibers) that is greater than about 100 microns in thickness.

In embodiments, the disclosed organic-inorganic composite can have a discontinuous phase comprised of an inorganic material, and the inorganic material can be, for example, an oxide glass, a fluoride glass, or an oxyfluoride glass.

In embodiments, the disclosed organic-inorganic composite can have an organic matrix that can be, for example, a thermoplastic polymer, for example, a polyetherimide (PEI), a polyethersulfone (PS), a polyimide, and like polymers, or mixtures thereof.

In embodiments, the disclosure provides a method for making and using the disclosed composite(s).

BRIEF DESCRIPTION OF THE DRAWINGS

In embodiments of the disclosure.

DETAILED DESCRIPTION

Figure 1:
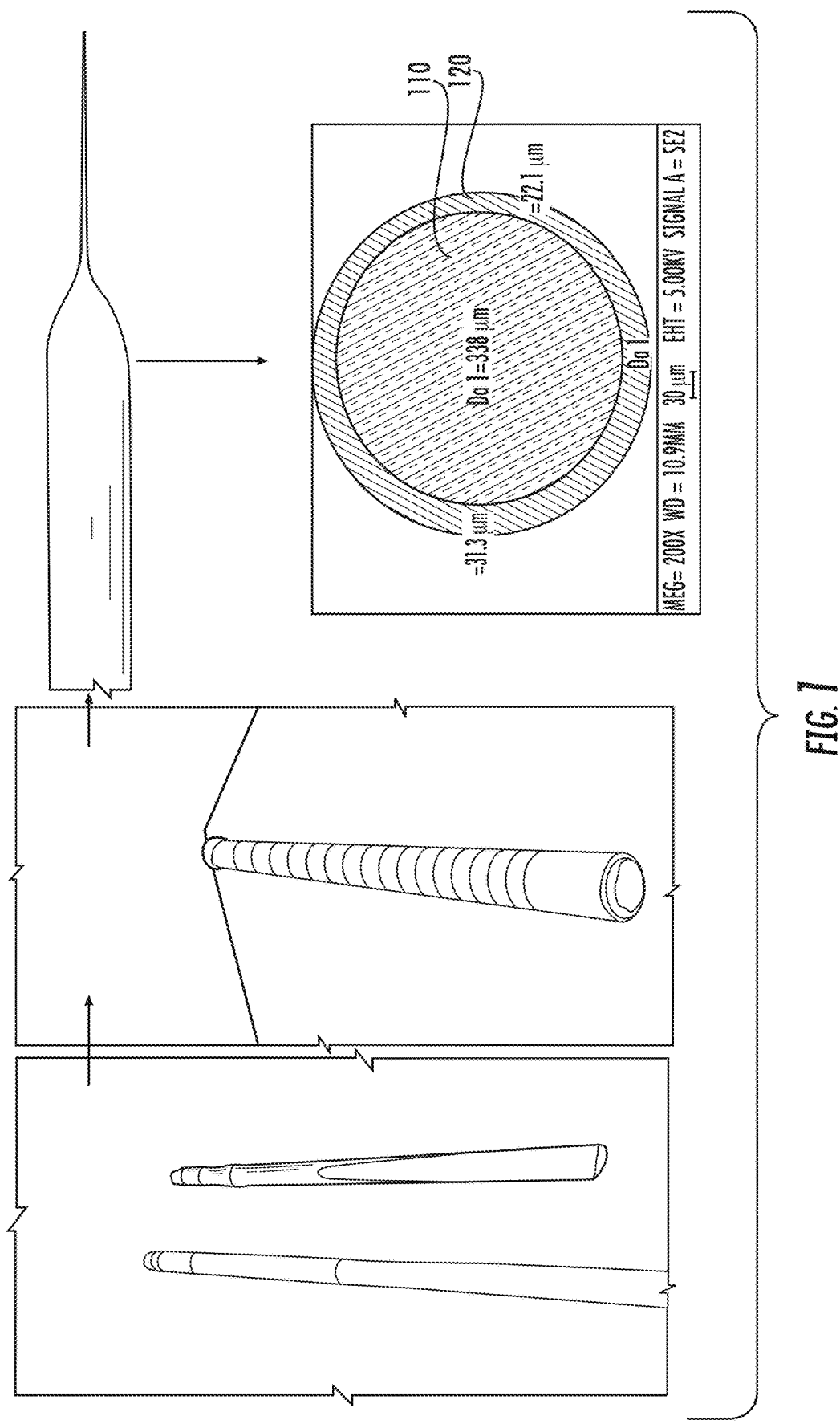
FIG. 1 shows images of process steps leading to a fiber draw step 1.

Various embodiments of the disclosure will be described in detail with reference to drawings, if any. Reference to various embodiments does not limit the scope of the invention, which is limited only by the scope of the claims attached hereto. Additionally, any examples set forth in this specification are not limiting and merely set forth some of the many possible embodiments of the claimed invention.

Definitions

"Include," "includes," or like terms means encompassing but not limited to, that is, inclusive and not exclusive.

"About" modifying, for example, the quantity of an ingredient in a composition, concentrations, volumes, process temperature, process time, yields, flow rates, pressures, viscosities, and like values, and ranges thereof, or a dimension of a component, and like values, and ranges thereof, employed in describing the embodiments of the disclosure, refers to variation in the numerical quantity that can occur, for example: through typical measuring and handling procedures used for preparing materials, compositions, composites, concentrates, component parts, articles of manufacture, or use formulations; through inadvertent error in these procedures; through differences in the manufacture, source, or purity of starting materials or ingredients used to carry out the methods; and like considerations. The term "about" also encompasses amounts that differ due to aging of a composition or formulation with a particular initial concentration or mixture, and amounts that differ due to mixing or processing a composition or formulation with a particular initial concentration or mixture.

"Optional" or "optionally" means that the subsequently described event or circumstance can or cannot occur, and that the description includes instances where the event or circumstance occurs and instances where it does not.

The indefinite article "a" or "an" and its corresponding definite article "the" as used herein means at least one, or one or more, unless specified otherwise.

Abbreviations, which are well known to one of ordinary skill in the art, may be used (e.g., "h" or "hrs" for hour or hours, "g" or "gm" for gram(s), "mL" for milliliters, and "rt" for room temperature, "nm" for nanometers, and like abbreviations).

Specific and preferred values disclosed for components, ingredients, additives, dimensions, conditions, times, and like aspects, and ranges thereof, are for illustration only; they do not exclude other defined values or other values within defined ranges. The composition and methods of the disclosure can include any value or any combination of the values, specific values, more specific values, and preferred values described herein, including explicit or implicit intermediate values and ranges.

In embodiments, the disclosure provides a method of improving the crack resistance of organic-inorganic composites, specifically, the crack resistance can be increased dramatically as the individual domain sizes are reduced below 1 micron, and especially when domain sizes are reduced into the 20 to 500 nm range (see e.g., Cordero, et. al., "Channel cracks in a hermetic coating consisting of organic and inorganic layers,"*Appl. Phys. Lett.* 90, 111910 (2007)). In a properly engineered composite, crack growth can be arrested or deflected at domain interfaces, thus limiting the effective flaw size, stress intensity at crack tips, or both, leading to enhanced toughness.

Examples of enhanced toughness of nano-structured organic-inorganic composites in biological materials such as nacre and abalone shells has been noted (see e.g., Jackson, et. al., "The mechanical design of nacre," *Proc. R. Soc. Lond.* B 234, 415 (1988); Li, et. al., "Pervasive nano-scale deformation twinning as a catalyst for efficient energy dissipation in a bioceramic armour," *Nature Materials* 13, 501 (2014); and Barber, et. al., "Extreme strength observed in limpet teeth," *J. R. Soc. Interface,* 12: 20141326 (2014)). These materials are typically characterized by high inorganic content (e.g., greater than 80% by volume), 20 to 500 nm domain sizes, high adhesion between organic and inorganic phases, and high ductility of the organic phase. A few of these biological materials have been found to exhibit good optical transmission (see Li, et. al., supra.). These materials combine the strength from the inorganic phase with toughness produced by the nanostructure and ductile organic phase. Recently, some of these biological nanocomposites have been measured to have a tensile strength as high as 3 to 6 GPa, a tensile modulus of about 120 GPa, and a failure strain of 4 to 6% (see Barber, et. al., supra.). Although it is known that these natural materials have superior combinations of strength and toughness, attempts to fabricate man-made versions of the natural materials have been limited to small-scale and relatively expensive laboratory approaches (see e.g., Tang, et. al., "Nanostructured artificial nacre," *Nature Materials* 2, 413 (2003); and Podsiadlo, et. al., "Ultrastrong and stiff layered polymer nanocomposites," *Science* 318, 80 (2007)). Scalable and cost-effective methods for manufacturing this type of strong and tough nanocomposites remains a challenge in material science.

Beall studied thermally co-deformable glass-polymer composites (U.S. Pat. No. 5,043,369 (1991), to Beall, et. al., "Glass/Glass-ceramic-plastic alloy articles,"). However, that work did not explore the creation of sub-micron or nano-sized domains in such composites. Hart studied thermal co-deformation of layered glass-polymer composites into the 20 to 500 nm layer thickness range, but that work did not explore mechanical properties of such structures, nor did it explore structures with high inorganic content (see Hart et. al., "External reflection from omnidirectional dielectric mirror fibers", *Science* 296, 510 (2002)). Various workers have explored multilayer organic-inorganic films for water vapor barriers in OLED applications. However, these structures typically have a high volume fraction of organic material, and thus are not optimized for simultaneous high strength and toughness, nor for low CTE and high toughness, nor for other mechanical targets (see Park, et. al., "Thin film encapsulation for flexible AM-OLED: a review", *Semiconductor Sci. Technol.* 26 034001 (2011)). Weber, et. al., have shown that thermal deformation processing (e.g., extrusion, stretching) can be used to mass produce large volumes of multilayer polymer films having sub-micron layer dimensions, but this work only explored polymer materials with no inorganic component (see Weber et. al., "Giant Birefringent Optics in Multilayer Polymer Mirrors," *Science*, 287 2451 (2000)).

Yaman mentions an iterative co-drawing of chalcogenide-based glasses in compatible polymer matrices similar to fiber drawing to produce nanowires and nanotubes. (see Yaman, et. al., "Arrays of indefinitely long uniform nanowires and nanotubes," *Nature Materials,* 10, (2011)). However, Yaman did not identify or make use of an inorganic component having optical transparency to visible light, nor did the inorganic component of Yaman comprise an oxide, a fluoride, or an oxyfluoride glass.

In embodiments, the disclosure provides an organic-inorganic composite, comprising:

a discontinuous phase comprised of a plurality of adjacent and similarly oriented (e.g., substantially parallel) fibers of an inorganic material; and a continuous organic phase comprised of a thermoplastic polymer, wherein the continuous organic phase surrounds the plurality of adjacent and similarly oriented fibers of the inorganic material, and the organic-inorganic composite is a plurality of adjacent and similarly oriented fibers of inorganic material contained within or surrounded by a similarly oriented host fiber of the thermoplastic polymer.

In embodiments, the inorganic material can be, for example, an oxide glass, and the organic phase can be, for example, a thermoplastic polymer.

In embodiments, the oxide glass can be, for example, zinc sulfophosphate ("ZSP"), and the thermoplastic polymer can be, for example, selected from a polyetherimide (PEI), a polyethersulfone (PS), a polyimide, and like polymers, or mixtures thereof.

In embodiments, the oxide glass can have, for example, a glass transition (Tg) temperature from 200 to 450° C., including intermediate values and ranges.

In embodiments, the oxide glass can have, for example, at least one characteristic average dimension of from 0.01 to 10 microns, such as 0.1 to 9.9 microns, 0.2 to 9 microns including intermediate values and ranges.

In embodiments, the disclosure provides a method of making the above mentioned organic-inorganic composite, comprising:

a first melting at a suitable temperature (e.g., at 800° C. for 3 hrs in covered Pt crucible), a batch (or a plurality of batches) of suitable proportions of inorganic sources or precursors comprising:

15 to 20% zinc oxide;

8 to 12% lithium phosphate, or for example, a mixture of $P_2O_5$ and $Li_2O$;

4 to 8% zinc pyrophosphate;

12 to 16% potassium monophosphate;

12 to 16% sodium hexametaphosphate;

0.1 to 2% calcium carbonate;

0.1 to 2% strontium carbonate;

4 to 10% aluminum metaphosphate; and 20 to 40% zinc sulfate heptahydrate, based on a 100 weight percent total of the inorganic portion of the composite.

In embodiments, the method can further comprise, for example, a second melting (e.g., at 800° C. for 3 hrs in covered Pt crucible) of the product of the first melting. The second melting or "remelting" can be, for example, optional and is unnecessary if different melting equipment such as having greater batch capacity is available.

In embodiments, the method can further comprise, for example, pouring or extruding the product of the first melt into a rod (e.g., 1×6 inch rods) and annealing the rod at (e.g., 320° C.) to form an annealed ZSP glass rod.

In embodiments, the method can further comprise, for example, extruding the annealed ZSP glass rod form an extruded and annealed ZSP glass rod. (e.g., at from 400 to 600° C., or 450 to 550° C.).

In embodiments, the method can further comprise, for example, wrapping the extruded and annealed ZSP glass rod in a thermoplastic polymer film selected from a polyetherimide (PEI), a polyethersulfone (PS), and like polymers, or mixtures thereof, to form a polymer wrapped glass rod, with the thermoplastic polymer film having a thickness of from 0.1 to 5 mm as shown in FIG. 1.

In embodiments, the method can further comprise, for example, heating the polymer wrapped glass rod to form a glass and polymer rod preform, e.g., heating under vacuum at 290° C. for 75 mins, followed by pressurization to atmosphere by adding $N_2$ gas to the oven and continued heating at 290° C. for 5 more mins, as shown in FIG. 1.

In embodiments, the method can further comprise, for example, drawing the glass and polymer rod preform to produce a drawn fiber, e.g., into continuous lengths of fiber using an optical fiber draw tower at about 445° C. under Ar gas flow.

In embodiments, the above drawn polymer-clad, glass core fiber can be, for example, a diameter of from 10 to 500 microns, e.g., 100 to 300 microns, as shown in FIG. 1.

In embodiments, the method can further comprise any or all of the following steps, for example:
 making a fiber bundle preform (i.e., "step 2");
 heating the drawn fiber;
 stacking the heated and drawn fiber into a fiber bundle of from 100 to 2,000 fibers; and
 wrapping and heat sealing the fiber bundle with a thermoplastic film, e.g., an outer layer of PEI film.

Figure 2:
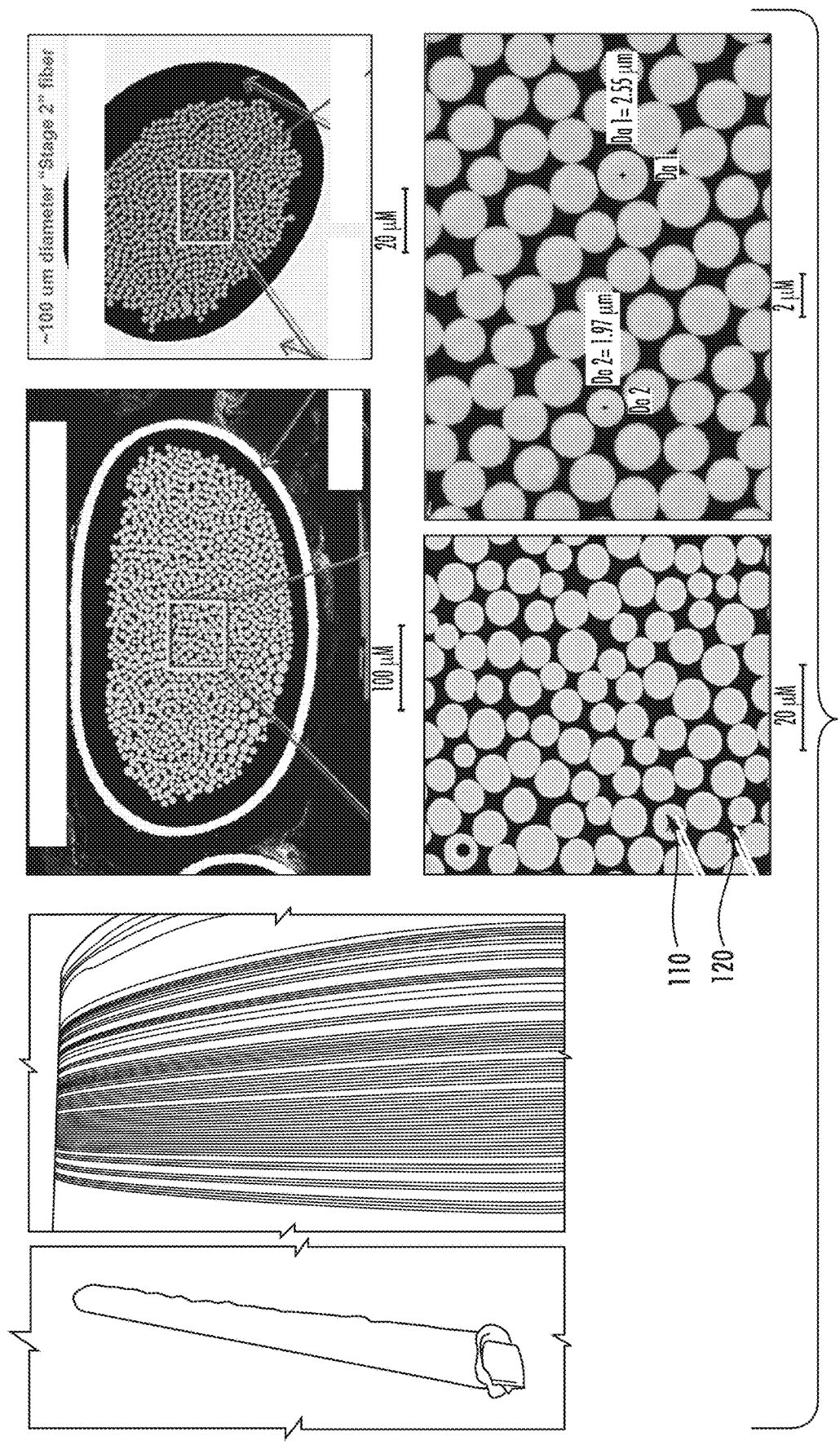
FIG. 2 shows images of process steps leading to fiber draw step 2.

For example, the heating can be, for example, baking at 170 to 190° C. for at least 2 hrs and then stacking the fibers into a bundle of about 800 fibers (as shown in FIG. 2) and heat sealing this bundle with an outer layer of PEI film by heating at 290° C. for 90 mins under vacuum, followed by pressurization to atmosphere with $N_2$ and continued dwell at 290° C. for 5 more mins.

In embodiments, the method can further comprise, for example, drawing the fiber bundle preform into a first fine fiber (e.g., drawing the fiber bundle in an optical fiber draw tower at 420 to 440° C. under Ar atmosphere), wherein continuous individual glass filaments in the composite have diameters, for example, from 2 to 10 microns, and the first fine microstructured fiber having an exterior diameter of about 100 to 300 microns (as shown in FIG. 2).

In embodiments, the method can further comprise, for example, drawing the resulting first fine fiber into a second fiber bundle, heating and consolidating this second fiber bundle, then re-drawing this second fiber bundle into a second fine nanostructured fiber (e.g., at 410 to 420° C. under Ar atmosphere) (i.e., step 3), and the second fine fiber having an exterior diameter of from about 10 to 150 microns.

In embodiments, the disclosure provides a method of making a nanocomposite, comprising:
 contacting an oxide glass and a thermoplastic polymer at a temperature where each has a viscosity below $10^{11}$ Poise, i.e., about $10^{10}$ Pa-s, or even below about $10^8$ Poise, to form the nanocomposite where the resulting organic, inorganic, or both, have a domain size having an average characteristic dimension along at least one direction, or at least two directions, that are less than 10 microns, less than 2 microns, less than 1 micron, less than 0.5 microns, or even less than 0.1 microns.

In embodiments, the disclosure provides an organic-inorganic composite comprising:
 an inorganic glass; and
 a thermoplastic polymer,
wherein the thermoplastic surrounds the inorganic glass, and the inorganic glass comprises, for example, glass fibers, glass filaments, or mixtures thereof, having an average cross-section diameter less than 10 microns and a length to diameter (i.e., length:diameter; L:D) ratio greater than 100:1, or an L:D even greater than about 1000:1.

In embodiments, the inorganic glass and the thermoplastic polymer can have, individually or in combination, for example, a Tg of from 300 to 450° C. such as less than or equal to 450° C., about 400° C., or about 350° C. or below, including intermediate values and ranges.

In embodiments, the final product composite can have a visible optical transmittance of from 20% to greater than 50%, for a 0.1 mm thick section, e.g., about 20% for a 0.1 mm or even a 1 mm thick section.

In embodiments, of from 20% to greater than 50%, of the inorganic glass filaments (e.g., as measured by filament number, volume, or cross-sectional area), can have a cross-sectional diameter, for example, of less than 1 micron, such as from 0.01 to 0.99 microns.

In embodiments, the inorganic glass can have, for example, a volume fraction of greater than 70% of the entire composite, or greater than 70% of a sub-region within the composite, the sub-region being at least about 100×100×100 microns in size, and the sub-region comprising 100 or more distinct inorganic domains partly or substantially separated by organic material such as measured when inspected by SEM or TEM or like methods.

In embodiments, the composite can have, for example, an average tensile breakage strength (stress) of greater than 100 MPa, or greater than 200 MPa such as from 100 to 300 MPa, including intermediate values and ranges.

In embodiments, the inorganic glass can comprise at least one of: an oxide glass, a fluoride glass, an oxyfluoride glass, a phosphate glass, a zinc sulfophosphate glass, or a combination thereof.

In embodiments, the disclosure provides an organic-inorganic composite, comprising:
 an inorganic phase comprised of an oxide, fluoride, or oxyfluoride glass situated in a plurality of adjacent domains; and
 an organic phase comprised of a thermoplastic polymer, wherein the organic phase substantially surrounds or bounds the plurality of adjacent domains of the inorganic phase.

The combined inorganic phase and organic phase define the domain sizes of the inorganic material, and at least one average characteristic dimension (e.g., two dimensions) of the inorganic domains is less than about 1 micron, and both the inorganic phase and the organic phase have a glass transition temperature, softening temperature, or both below about 450 □.

In embodiments, the composite can have a two-dimensional array structure that is substantially continuous along one axis (e.g., along a fiber axis), and having an average characteristic dimension of discontinuous domains that is below 1 micron substantially in two dimensions (e.g., along two geometrical axes).

In embodiments, the average characteristic dimension of the discontinuous domains can be, for example, below about 0.8 microns.

In embodiments, the average characteristic dimension of discontinuous domains can be, for example, below about 0.5 microns.

In embodiments, the inorganic phase can include a phosphate-containing glass.

In embodiments, the inorganic phase can be a glass that is substantially free of: arsenic, selenium, tellurium, lead, chlorine, or any and all mixtures thereof.

In embodiments, the inorganic phase or inorganic glass can have a volume fraction greater than about 70% of the entire composite, or greater than 70% of a sub-region within the composite, the sub-region being at least 100×100×100 microns in size, and the sub-region comprising 100 or more distinct inorganic domains partly or substantially separated by organic material.

In embodiments, the composite can have a visible optical transmittance greater than 20% for a 0.1 mm thick section.

In embodiments, the composite can have the organic phase and inorganic phase having a glass transition, a softening temperature, or both, below about 350 □.

In embodiments, the composite can have an average tensile breakage strength (stress) of from 100 MPa, or greater.

The present disclosure is advantaged in several aspects, including for example:

the thermal forming is a scalable manufacturing process;

the thermal forming permits secondary forming into complex articles, for example, using molding, fusing, blowing, embossing, pulling, drawing, extruding, wrapping, weaving, knitting, or 3D printing accompanied with temperature to soften or fuse the initial composite into complex shapes, for example auto parts, bone replacements, smartphone housings, and like structures, and the initial composite can be, for example, a sheet, a fiber, or a pellet; and the inorganic packing fraction, which can exceed the theoretical limit of wet spherical particle processes is feasible, for example, providing an inorganic volume fraction greater than 70, 80, or 90%.

In embodiments, the oxide glass can have a $T_g$, for example, of from about 500° C. to 400° C., or less.

In embodiments, the disclosed organic-inorganic composite can have an inorganic fiber or an inorganic filament density, for example, of greater than 100 fibers or filaments, visible in the composite when viewed in an SEM, TEM, or optical microscope. In embodiments, the at least 100 fibers or filaments can be substantially aligned in parallel with one another and the group of at least 100 fibers or filaments can be separated from one another by less than 1 inorganic fiber diameter, or less than 0.5 inorganic fiber diameters. In embodiments, the average physical thickness of the polymer matrix separating all of the at least 100 fibers (measured at the closest point between adjacent inorganic fibers) can be, for example, less than 1 or less than 0.5 inorganic fiber diameters between each pair, or at least 80% of the pairs, of the at least 100 fibers. In some instances, the inorganic fibers can be in contact or nearly in contact with one another, but the linear contact zone when viewed in an SEM cross-section can be, for example, less than 10% of the total inorganic fiber circumference, so that the inorganic fibers are still substantially separated by the polymer matrix between them.

In embodiments, the disclosed organic-inorganic composite can have at least some of the inorganic fibers or filaments having a diameter, for example, of from 10 nm to 5 microns, such as less than 3 microns, less than 1 micron, less than 500 nm, less than 300 nm, or less than 200 nm.

In embodiments, the disclosed organic-inorganic composite can have an inorganic or glass component that can comprise, for example, of from 50 to 70% by volume of the overall composite.

In embodiments, the disclosed organic-inorganic composite can have an inorganic component, a glass component, or both that is substantially free of arsenic, selenium, tellurium, lead, and chlorine.

In embodiments, the disclosed organic-inorganic composite can have an oxide glass that contains, for example, phosphorous, zinc, sulfur, or mixtures thereof.

In embodiments, the disclosed organic-inorganic composite can have composite fibers having an average tensile breakage strength (stress), for example, of from about 100 to about 300 MPa.

In embodiments, the disclosed organic-inorganic composite can have one or more composite sub-regions comprising, for example, greater than about 70%, greater than about 80%, or even greater than about 90% by volume fraction inorganic material, and at least the inorganic material is transparent to visible light, and the one or more composite sub-regions can be defined by, for example:

greater than about 100 inorganic fibers or filaments that are substantially adjacent to one another, the fibers or filaments are substantially aligned in parallel and the average spacing (substantially filled with organic material) or separation between fibers is, for example, less than one fiber diameter, the inorganic fibers or filaments having a cross-sectional diameter, for example, of less than 10 microns;

or a region that encompasses at least 100 inorganic domains, where the inorganic domains can be fibers, particles, or another geometry, and the inorganic domains can be arranged randomly or semi-randomly but on average are packed in such a way that average local neighbor distances are less than about 1× a characteristic or average cross-sectional length or diameter of the inorganic domains, the spaces between the domains being substantially filled with organic material, the inorganic domains being less than about 10 microns in diameter;

or a region that is greater than about 10×10×10 microns in size, greater than 10×10×100 microns in size, or greater than about 100×100×100 microns in size, comprising about 100 or more distinct inorganic domains partly or substantially separated by organic material.

In embodiments, the disclosure provides a method for making the disclosed composite(s) where the organic and inorganic components are both thermally formable due to substantial amorphous, glassy, or thermoplastic character, and the organic and inorganic components are thermally formed in contact with one another at an identical or near-identical process set point temperature(s) in a single process chamber or apparatus (e.g., an optical fiber draw tower, a multi-component melting apparatus, or a multi-component extruder, a nozzle, a die, an orifice, or other fixed point where the organic and inorganic components are brought together in a controlled manner).

The organic and inorganic components can both have a viscosity below about $10^{11}$ Poise (i.e., $10^{10}$ Pa-s), below about $10^8$ Poise, or even below about $10^7$ Poise, at the point when they are brought into contact at an elevated temperature (e.g., a temperature of from than 50° C. to 150° C. or more).

In embodiments, the disclosure provides a low-Tg or low-softening-point glass, which is preferably an oxide glass, a fluoride glass, an oxyfluoride glass, a phosphate glass, or a zinc sulfophosphate (ZSP) glass. The glass is melted and formed into rods using, for example, a molding or extrusion process, and then is coated or wrapped with a thermoplastic polymer. The glass-polymer combination is heated above the Tg or softening temperature of both the glass and the polymer and drawn into a fiber. This first fiber is then stacked or bundled into an array of many fibers, bonded together, then stretched or drawn again into a composite containing inorganic fibers with an average cross-sectional dimension, for example, below 10 microns substantially surrounded by an organic matrix. The stacking and re-drawing is optionally repeated again to further reduce the domain sizes. The final resulting inorganic fiber cross-section diameters (as an average of all the fibers, or as a portion of the fibers of from 10 to 50% of the population or more) can be, for example, 1 micron, 0.5 micron, 0.2 microns, 0.1 micron, including intermediate values and ranges.

In embodiments, the disclosure provides a low-melting-point zinc sulfophosphate ("ZSP") glass. The glass was prepared by melting suitable proportions of sources or precursors for: zinc oxide, lithium phosphate, zinc pyrophosphate, potassium monophosphate, sodium hexametaphosphate, calcium carbonate, strontium carbonate, aluminum metaphosphate, and zinc sulfate heptahydrate at 800° C. for 3 hrs in one or more covered Pt crucibles. The melts were subsequently combined and remelted in covered Pt crucibles at 800° C. for an additional 3 hrs before being poured into 1×6" rods and annealed at 320° C. The annealed ZSP glass rod was then extruded at a temperature of 450° C. at the start of the extrusion into rods having a diameter of about 12 mm, and the temperature was ramped up to 500° C. during the extrusion.

Referring to the Figures, FIG. 1 shows images of process steps leading to a fiber draw step 1.

Left: Extruded rods of transparent alkali zinc sulfophosphate (ZSP) glass, having a nominal composition of Glass 6 of U.S. Pat. No. 5,328,874, to Beall, et. al.

Middle: ZSP glass after cladding and vacuum heat sealing with a polyetherimide (PEI) polymer.

Top right: PEI clad ZSP glass being drawn from a rod into a fiber, showing the thermal co-processing of both polymer and glass materials.

Bottom right: schematic of a SEM cross-section of the fiber resulting from the step 1 draw, showing glass core (110) having a diameter of about 340 microns, and a polymer cladding (120) having a thickness of from about 20 to about 30 microns.

FIG. 2 shows images of process steps leading to fiber draw step 2.

Left: Bundle of drawn fibers from the end of "step 1" (shown in FIG. 1), each fiber having a diameter of about 300 microns, are bundled into a new fiber "preform" having about a 12 mm diameter, and heat sealed with a secondary polymer cladding (PEI) layer. This preform was again drawn into the step 2 fibers shown macroscopically as a spool of fiber in the left-middle image, and microscopically in the SEM cross-section in the middle and right images. Step 2 (aka.: stage 2) fibers having a total diameter of about 100 to 300 microns have individual glass fiber or filament domain sizes, for example, of from about 2 to 10 microns.

Figure 3:
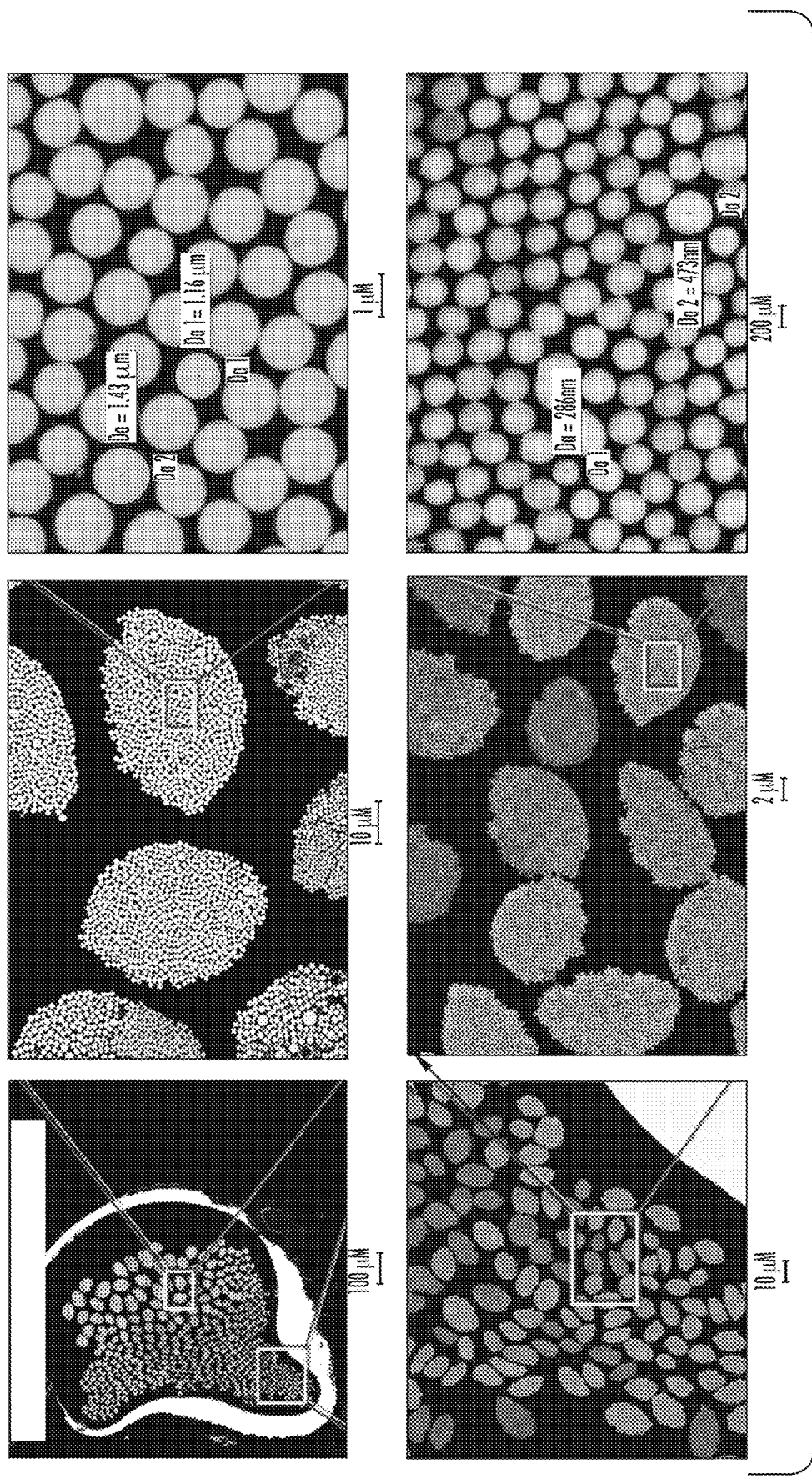
FIG. 3 shows SEM cross-section images of fibers resulting from fiber draw step 3.

FIG. 3 shows SEM cross-section images of representative fibers resulting from fiber draw step 3. A bundle of drawn fibers from the end of step 2 (shown in FIG. 2), each fiber having a diameter of about 300 microns, were bundled into a new fiber "preform" having a diameter of about 12 mm, and then heat sealed with a secondary polymer cladding (PEI) layer. This preform was drawn again into the step 3 fibers having a diameter of from about 200 to 500 microns. The fiber draw was somewhat non-uniform in this experiment, leading to varying sizes of composite domains and individual glass filaments. Individual glass fiber/filaments have diameters of from about 300 nm to about 1.5 microns in these images.

Figure 4:
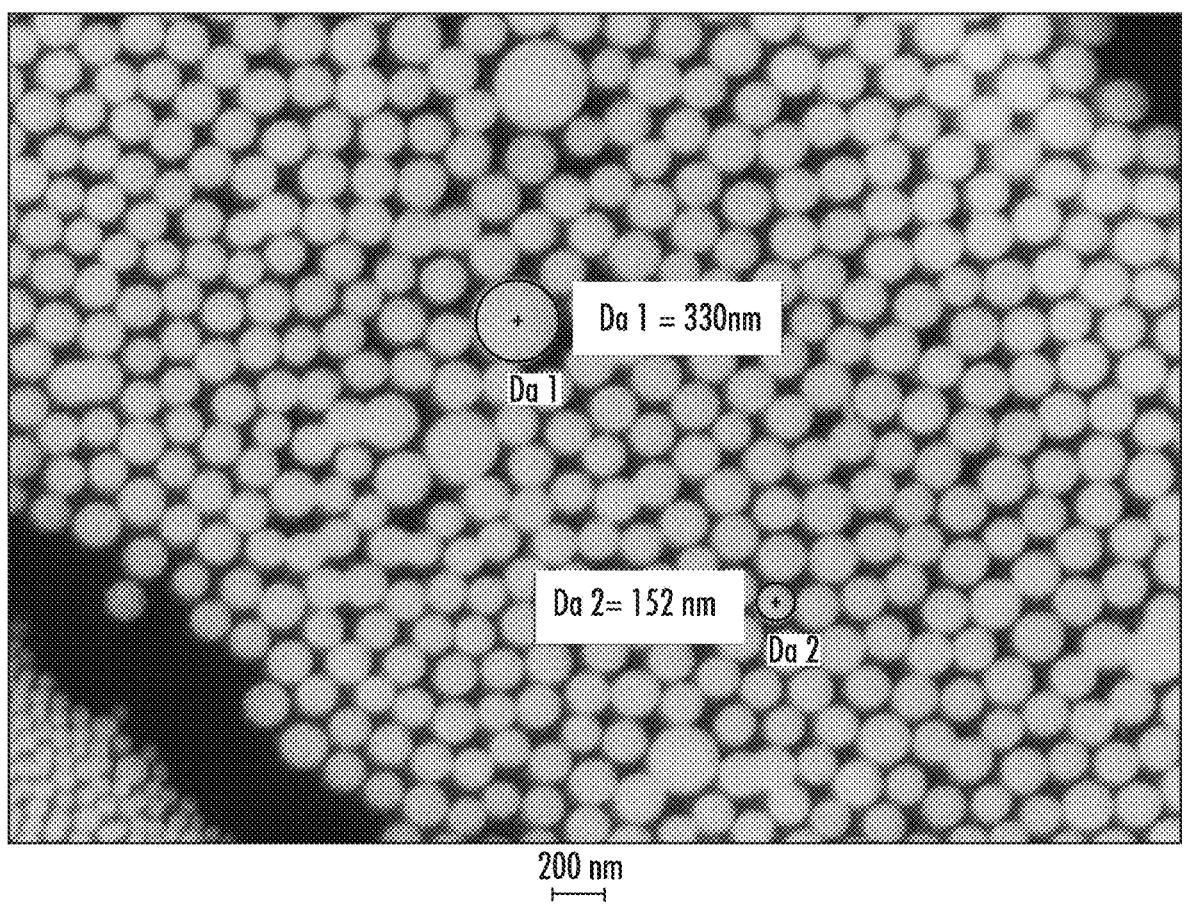
FIG. 4 shows an SEM cross-section image of some of the smallest individual fiber/filaments within the composite matrix resulting from fiber draw step 3.

FIG. 4 shows an SEM cross-section image of some of the smallest individual fiber/filaments within the composite matrix resulting from fiber draw "step 3". Individual glass filaments were measured as having a diameter as small as about 150 nm, and having filament diameters well below about 100 nm as seen in bottom left corner of the image. This image demonstrates the feasibility of creating unexpectedly small sulphophosphate glass fibers or filaments embedded in a polymeric matrix using thermal processing where both the discontinuous glass phase and the continuous polymer phase are above their respective softening points. The structural integrity of the nanofibers and of the glass/polymer composite is maintained throughout the thermal processing and SEM sample preparation.

Polyetherimide ("PEI") films (brand name Ultem®) of 0.25 mm thickness were cleaned with isopropyl alcohol and baked in a vacuum oven at 190° C. for 2.5 hrs. These films were then wrapped onto the ZSP glass rods, held in place with PTFE tape, and heat sealed to the glass rods by heating under vacuum at 290° C. for 75 mins, followed by pressurization to atmosphere by adding $N_2$ gas to the oven and continued heating at 290° C. for 5 more mins. This glass and polymer rod preform was then drawn into continuous lengths of fiber using an optical fiber draw tower at about 445° C. under Ar gas flow. Care was taken to bake out moisture from the polymer cladding prior to draw, by heating at 150° C. overnight under flowing Ar. The resulting fibers from this draw step (i.e., "step 1") are shown in the FIG. 1 (lower right) and had a diameter of about 300 microns. These drawn fibers were then processed into a step 2 preform by baking at 170 to 190° C. for at least 2 hrs and then stacking the fibers into a bundle of about 800 fibers (as shown in the left of FIG. 2) and heat sealing this bundle with an outer layer of PEI film by heating at 290° C. for 90 mins under vacuum, followed by pressurization to atmosphere with $N_2$ and continued dwell at 290° C. for 5 more mins. The resulting step 2 preform was then drawn into extended lengths (10's of meters) of continuous fiber with a polymer-glass composite structure as shown in the left-middle, middle, and right images and SEM cross-sections in FIG. 2, with continuous individual glass filaments in the composite having diameters from about 2 to 10 microns, and total fiber diameters of about 100 to 300 microns. These step 2 fibers were drawn in an optical fiber draw tower at 420 to 440° C. under Ar atmosphere. These step 2 fibers were then bundled again to make a step 3 preform using the preceding processes, and drawn into a step 3 fiber at 410 to 420° C. under Ar atmosphere. It was difficult to obtain long lengths of uniform fiber. Nevertheless short lengths of fiber (e.g., 1 to 10 cm in length) were obtained having individual glass domain sizes in the composite as small as 100 nm or less as shown in FIG. 3.

The drawn fibers, particularly those from step 2 or step 3, can have a tendency to shrink upon re-heating due to frozen chain alignment of the polymeric domains (aka.: 'shape memory' effect). Fiber shrinkage in excess of 80% was attained for step 3 fibers upon re-heating to 350° C. after drawing. While this could be useful for applications where shape memory is needed, in the present stack-and-redraw process this shrinkage effect led to non-uniform fiber drawing, particularly in step 3. It was found that a thermal relaxation treatment, such as slow cooling or annealing, can be used to reduce or even eliminate the tendency of the drawn fibers to shrink, allowing them to retain uniform fiber shapes upon re-heating after they are drawn. For example, annealing of the step 2 or step 3 fibers at a temperature such as 280° C., which is above the Tg of the polymer (for PEI, about 210° C.) and below the Tg of the glass (for ZSP, about 310° C.) for 1 to 10 hrs can reduce the resultant shrinkage by more than 50% upon later heating to 350° C. With the proper annealing conditions, the shrinkage upon heating to temperatures higher than of from 10° to 40° C. above the highest Tg component of the composite, can be reduced to, for example, less than 20% to less than 1% of the original fiber length (i.e., essentially zero shrinkage). Shrinkage can also be tailored to a desired level or reduced using an in-line heating process during the fiber draw.

Preliminary average tensile failure stress data on drawn composite fibers (5 samples for each condition) were measured as follows: Fibers were clamped and tested in tension using an Instron tensile loading apparatus using known methods. The breakage load was recorded and divided by the cross-sectional area of the fiber to establish an average breakage strength/stress level.

In "Step 1" the single fiber has a diameter of about 300 micron and an average tensile breakage strength (stress) of: 133+/−32 MPa.

In "Step 2" the composite fiber has a diameter of about 300 microns with 2 to 10 micron diameter glass sub-fiber/filament domains and an average tensile breakage strength (stress) of: 267+/−41 MPa.

In embodiments, alternatively, co-extrusion fiber spinning methods can be used to prepare the disclosed glass-polymer composite fibers. Multi-component co-extrusion and spinning of fibers can use multiple extruders, multiple materials, and a die system which generates complex fiber cross-sections such as described, for example, in U.S. Pat. No. 8,798,421, to Bluem, et al., and related art.

In embodiments, bioactive, water soluble, or biodegradable glasses in combination with biodegradable or bioresorbable polymers can be selected for making the composite structure. These composite structures can be used, for example, as bandages, wound healing, tissue bonding, tissue growth promotion, biomedical implants, bone sutures, and like applications.

In embodiments, silanes, block polymers, surface-active additives, or other coupling agents or surface treatments can be used to promote or tailor the adhesion between the organic and inorganic domains.

In embodiments, the disclosure provides an organic-inorganic composite having discontinuous domains substantially along: two dimensions or two axes, for example, a fiber bundle, a honeycomb structure, a fiber, and like structures.

In the abovementioned two dimensional domains, a distinctive feature of the composite is that at least one average characteristic domain size along at least one dimension or axis can be, for example, 1 micron, 0.8 micron, 0.5 micron, 0.3 micron, or 0.1 micron, including intermediate values and ranges. Another distinctive feature of the disclosed composite is that both the organic and inorganic phases have a glass transition (Tg), a softening temperature, or both, of from 450 □, of from 350 □, of from 300 □, or less than 300 □, including intermediate values and ranges. Another distinctive feature of the disclosed composite is that it remains thermally deformable. Yet another distinctive feature of the composite is that the inorganic phase may comprise an oxide, fluoride, or oxyfluoride glass. Still another distinctive feature of the composite is that the inorganic phase, the entire composite, or both, can have an optical transmittance greater than about 20% for a 0.1 mm thick or even a 1 mm thick section.

A glass transition temperature (Tg) for both the organic and inorganic phase can be measured using known methods such as differential thermal analysis (DTA), differential scanning calorimetry (DSC), thermomechanical analysis (TMA), or dynamic mechanical analysis (DMA). Separate signals can typically be resolved in these tests for the organic and inorganic phases or components. In some instances, it is desirable to separate the signals from the organic and inorganic components using micromechanical approaches such as indentation, or by physically separating the organic and inorganic components, either by mechanical separation or by selective chemical etching and dissolution of one component. Softening temperature can be defined using various known test methods, such as the dilatometric softening test, Vicat softening test (ASTM D-1525), and heat deflection test (ASTM-D648).

In embodiments, the disclosed composites can be used in a variety of applications, for example, water or oxygen vapor barriers, glass-reinforced polymer composites, molded parts such as automotive parts, textiles, fabrics, aerospace composite materials, rotors and turbines, optically transparent or translucent composite articles having high strength and toughness, cabling reinforcements such as optical fiber cabling reinforcements, architectural materials, structural materials, personal protective equipment, safety shields, biomedical implants, sutures, and like applications.

EXAMPLES

The following Examples demonstrate making, use, and analysis of the disclosed materials and methods in accordance with the above general procedures.

Example 1

Method of Making Glass Rods—ZSP Glass Rods

Representative glass oxide compositions are known, see, for example, U.S. Pat. No. 6,268,425, to Frayer (Glass K), and especially U.S. Pat. No. 5,328,874, to Beall (Glass 6), and as listed in Table 1 (in mol %). These glass compositions were selected for their low Tg and softening temperatures and their relatively high mechanical strength, and chemical and moisture durability.

TABLE 1

Representative glass oxide compositions.

| | Composition (mol %) | | | | | | | | |
|---|---|---|---|---|---|---|---|---|---|
| | $P_2O_5$ | $Al_2O_3$ | $Na_2O$ | $Li_2O$ | $K_2O$ | $ZnO$ | $CaO$ | $SrO$ | $SO_3$ |
| Alkali Zinc SulfoPhosphate | 24.8 | 1.5 | 8 | 5.3 | 5.8 | 40.7 | 0.7 | 0.7 | 12.5 |

Table 2 lists a nominal composition that was targeted and actually realized for ZSP glass (in wt. %).

TABLE 2

ZSP glass composition (wt. %).

| | Component | | | | | | | |
|---|---|---|---|---|---|---|---|---|
| | $K_2O$ | $SO_3$* | SrO | $P_2O_5$ | CaO | $Li_2O$ | $Na_2O$ | $Al_2O_3$ | ZnO |
| Target (wt %) | 5.9 | 10.7 | 0.8 | 37.8 | 0.4 | 1.7 | 5.4 | 1.6 | 35.6 |
| Actual Analyzed (wt %) | 5.58 | 12.09 | 0.80 | 37.2 | 0.34 | 1.62 | 5.53 | 1.54 | 35.2 |

*$SO_3$ estimated by difference.

Table 3 lists batch materials in actual amounts used to prepare the disclosed oxide glass rods.

TABLE 3

Batch materials used for ZSP glass composition (wt).

| Batch Material | Amount (g) |
|---|---|
| zinc oxide | 344.26 |
| lithium phosphate - mono | 198.59 |
| zinc pyrophosphate | 122.17 |
| potassium phosphate, mono | 276.89 |
| sodium hexametaphosphate | 272.66 |
| calcium carbonate | 9.83 |
| strontium carbonate | 18.55 |
| aluminum metaphosphate | 132.08 |
| zinc sulfate, 7-hydrate | 624.98 |

The batch materials listed in Table 3, in the amounts indicated, were thoroughly mixed, divided into covered Pt crucibles, and heated to about 800° C. for about 3 hrs. The melts were subsequently combined and remelted in covered Pt crucibles at 800° C. for an additional 3 hrs before being poured into 1×6″ rods and annealed at 320° C. The cooled ZSP glass rod was then extruded with an Advantek Engineering Laboratory 1,500 kg hot glass extruder at a temperature of 450° C. at the start of the extrusion into rods having a diameter of about 12 mm, and the temperature was ramped up to 500° C. during the extrusion. The extruded rods were slowly cooled in air upon exiting the extruder.

Example 2

Method of Making PEI Coated ZSP Rod Composite Preforms

Polyetherimide ("PEI") films (brand name Ultem®) of 0.25 mm thickness were cleaned with isopropyl alcohol and baked in a vacuum oven at 190° C. for 2.5 hrs. These films were then wrapped onto the ZSP glass rods, held in place with PTFE tape, and heat sealed to the glass rods by heating under vacuum at 290° C. for 75 mins, followed by pressurization to atmosphere by adding $N_2$ gas to the oven and continued heating at 290° C. for 5 more mins.

Example 3

Method of Making PEI Coated ZSP Fibers

The glass and polymer rod composite preform of Example 2 was drawn into continuous lengths of fiber using an optical fiber draw tower at about 445° C. under Ar gas flow. Care was taken to bake out moisture from the polymer cladding prior to draw, by heating at 150° C. overnight under flowing Ar. The resulting fibers from draw "step 1" are shown in the FIG. 1 and had a diameter of about 300 microns.

Example 4

Method of Making Bundled Fiber Preforms

The drawn fibers of Example 3 were processed into a "step 2" preform by baking at 170 to 190° C. for at least 2 hrs and then stacking the fibers into a bundle of about 800 fibers (as shown in FIG. 2) and heat sealing this bundle with an outer layer of PEI film by heating at 290° C. for 90 mins under vacuum, followed by pressurization to atmosphere with $N_2$ and continued dwell at 290° C. for 5 more mins.

Example 5

Method of Making Drawn Bundled Fibers

This "step 2" preform of Example 4 was drawn into extended lengths (10's of meters) of continuous fiber with a polymer-glass composite structure as shown in the macroscopic pictures and in the SEM cross-sections in FIG. 3, with continuous individual glass filaments in the composite having diameters from about 2 to 10 microns, and total composite fiber diameters of about 100 to 300 microns. These step 2 fibers were drawn in an optical fiber draw tower at 420 to 440° C. under Ar atmosphere.

Example 6

Method of Making Second Bundled and Drawn Fibers

The "step 2" fibers of Example 5 were then bundled again to make a "step 3" preform by stacking the fibers into a bundle of about 800 fibers and heat sealing this bundle with an outer layer of PEI film by heating at 290° C. for 90 mins under vacuum, followed by pressurization to atmosphere with $N_2$ and continued dwell at 290° C. for 5 more mins. The PEI films were baked at 190° C. for 2+ hours prior to the heat-sealing step. This 'step 3' preform was then drawn into "step 3" fiber at 410 to 420° C. under Ar atmosphere in an optical fiber draw tower. Lengths of fiber (e.g., 1 to 10 cm in length) were obtained having individual glass domain sizes in the composite as small as 100 nm or less as shown in FIGS. 3 and 4.

While various features, elements or steps of particular embodiments can be described using the transitional phrase "comprising," it is understood that alternative embodiments, including those that may be described using the transitional phrases "consisting" or "consisting essentially of," are implied.

The disclosure has been described with reference to various specific embodiments and techniques. However, it should be understood that many variations and modifications are possible while remaining within the scope of the disclosure.

What is claimed is:

1. A method of making an organic-inorganic composite, comprising:
    a first melting at a suitable temperature, a batch of suitable proportions of sources or precursors comprising:
    15 to 20% zinc oxide;
    8 to 12% lithium phosphate;
    4 to 8% zinc pyrophosphate;
    12 to 16% potassium monophosphate;
    12 to 16% sodium hexametaphosphate;
    0.1 to 2% calcium carbonate;
    0.1 to 2% strontium carbonate;
    4 to 10% aluminum metaphosphate; and
    20 to 40% zinc sulfate heptahydrate, based on a 100 weight percent total of the inorganic portion of the composite to produce a product of the first melting; and
    a second melting of the product of the first melting.

2. The method of claim 1, further comprising: pouring or extruding the product of the first melt into a rod and annealing the rod at to form an annealed zinc sulfophosphate (ZSP) glass rod.

3. The method of claim 1, further comprising: extruding the annealed ZSP glass rod form an extruded and annealed ZSP glass rod.

4. The method of claim 2, further comprising: wrapping the extruded and annealed ZSP glass rod in a thermoplastic polymer film selected from a polyetherimide (PEI), a polyethersulfone (PS), or mixtures thereof, to form a polymer wrapped glass rod, the thermoplastic polymer film having a thickness of from 0.1 to 2.0 mm.

5. The method of claim 4, further comprising: heating the polymer wrapped glass rod to form a glass and polymer rod preform.

6. The method of claim 5, further comprising: drawing the glass and polymer rod preform to produce a drawn fiber having a diameter of from 10 microns to 500 microns.

7. The method of claim 6, further comprising: making a fiber bundle preform comprising:
    heating the drawn fiber;
    stacking the heated and drawn fiber into a fiber bundle of from 100 to 2,000 fibers; and
    wrapping and heat sealing the fiber bundle with a thermoplastic film.

8. The method of claim 7, further comprising: drawing the fiber bundle preform into a first fine fiber wherein continuous individual glass filaments in the composite have diameters from 2 to 10 microns, and the first fine fiber having an exterior diameter of about 100 to 300 microns.

9. The method of claim 8, further comprising: drawing the resulting first fine fiber into a second fine fiber, and the second fine fiber having an exterior diameter of from 10 to 150 microns.

* * * * *

UNITED STATES PATENT AND TRADEMARK OFFICE
CERTIFICATE OF CORRECTION

| | |
|---|---|
| PATENT NO. | : 10,875,806 B2 |
| APPLICATION NO. | : 16/013006 |
| DATED | : December 29, 2020 |
| INVENTOR(S) | : Heather Bossard Decker et al. |

It is certified that error appears in the above-identified patent and that said Letters Patent is hereby corrected as shown below:

On the Title Page

On page 2, in Column 2, item (56), Other Publications, Line 16, delete "Ultrastong" and insert -- Ultrastrong --, therefor.

On page 2, in Column 2, item (56), Other Publications, Line 18, delete "Artifical" and insert -- Artificial --, therefor.

Signed and Sealed this
Twenty-fifth Day of October, 2022

Katherine Kelly Vidal
*Director of the United States Patent and Trademark Office*